(12) United States Patent
Liu et al.

(10) Patent No.: US 7,691,946 B2
(45) Date of Patent: Apr. 6, 2010

(54) SOY-BASED THERMOSENSITIVE HYDROGELS FOR CONTROLLED RELEASE SYSTEMS

(75) Inventors: Zengshe Liu, Peoria, IL (US); Sevim Z. Erhan, Peoria, IL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 528 days.

(21) Appl. No.: 11/240,426

(22) Filed: Sep. 30, 2005

(65) Prior Publication Data

US 2007/0077298 A1  Apr. 5, 2007

(51) Int. Cl.
*C08L 91/00* (2006.01)
*C08G 59/00* (2006.01)

(52) U.S. Cl. .................... 525/111.5; 528/365

(58) Field of Classification Search ........... 424/468; 525/111.5; 528/365
See application file for complete search history.

(56) References Cited

U.S. PATENT DOCUMENTS

| | | | |
|---|---|---|---|
| 4,287,078 A | | 9/1981 | Langdon et al. |
| 4,335,027 A | * | 6/1982 | Cremeans et al. ........... 528/281 |
| 4,524,182 A | * | 6/1985 | Bauer et al. ................. 525/120 |
| 5,612,445 A | * | 3/1997 | Jones ........................ 528/295.5 |
| 6,121,398 A | * | 9/2000 | Wool et al. ................. 526/238.1 |
| 6,207,346 B1 | * | 3/2001 | Johnson ..................... 430/284.1 |
| 6,312,826 B1 | * | 11/2001 | Shogren ..................... 428/507 |
| 6,444,378 B1 | * | 9/2002 | Johnson ....................... 430/18 |
| 6,583,302 B1 | * | 6/2003 | Erhan et al. ................. 554/213 |
| 6,639,014 B2 | | 10/2003 | Pathak et al. |
| 2001/0026803 A1 | * | 10/2001 | Tebbe et al. ................. 424/416 |
| 2004/0192859 A1 | * | 9/2004 | Parker et al. ................ 525/438 |
| 2006/0009365 A1 | * | 1/2006 | Erhan et al. ................. 508/486 |

OTHER PUBLICATIONS

Product Information "Epoxidized Soybean Oil".*
Wanka, G., et al., "Phase Diagrams and Aggregation behavior of Poly(oxyethylene)-Poly(oxypropylene)-Poly(oxyethylene) Triblock Copolymers in Aqueous Solutions", *Macromolecules*, 1994, 27, pp. 4145-4159.
Malmsten, Martin, et al., "Self-Assembly in Aqueous Block Copolymer Solutions", *Macromolecules*, 1992, 25, pp. 5440-5445.

* cited by examiner

*Primary Examiner*—Mark Eashoo
*Assistant Examiner*—Megan McCulley
(74) *Attorney, Agent, or Firm*—John D. Fado; Randall E. Deck; Lesley Shaw

(57) ABSTRACT

Biopolymeric hydrogel precursors are prepared by means of a ring-opening polymerization of epoxidized vegetable oils, followed by chemical hydrolysis. The recovered hydrogels having properties similar to Pluronic® type surfactants would have a plurality of end-use applications, including use as food additives and pharmaceutical ingredients. This invention provides the potential for an enhanced market for vegetable oils, and particularly for soybean oil.

18 Claims, No Drawings

US 7,691,946 B2

SOY-BASED THERMOSENSITIVE HYDROGELS FOR CONTROLLED RELEASE SYSTEMS

BACKGROUND OF THE INVENTION

1. Field of the Invention

This invention relates to preparation of hydrogels and their alkali precursors from biopolymers, wherein the hydrogels have amphiphilic properties. These hydrogels are useful in drug delivery systems.

2. Description of the Prior Art

Polymeric drug delivery systems have attracted increasing attention during the last two decades. Amphiphilic block copolymers have been widely studied due to their potential application in drug delivery systems as they are capable of forming aggregates in aqueous solutions. These aggregates comprise of a hydrophobic core and hydrophilic shell. They are good vehicles for delivering hydrophobic drugs, since the drugs are protected from possible degradation by enzymes [Bae, Y. H. et al., *J. Controlled Release*, 64:3-13, 2000; Gan, Z. H. et al., *Macromolecules*, 32:590-594, 1999; Ge, H. X. et al., *J. Pharm. Sci.*, 91:1463-1473, 2002; Kosita, M. J. et al., *Macromolecules*, 32:5539-5551, 1999; Lee, S. H. et al., *Macromol. Res.*, 10:85-90, 2002; Wu, C. et al., *Macromolecules*, 30:4574-4583, 1997; Yekta, A. et al., *Macromolecules*, 28:956-966, 1995; Yuan, M. L. et al., *Macromolecules*, 33:1613-1617, 2000; Zhao, Y. et al., *J. Phys. Chem. B.*, 105: 848-851, 2001; Rosler, A. et al., *Adv. Drug Delivery Rev.*, 53:95-108, 2001].

Temperature-gelling PEO-PPO-PEO triblock copolymers of poly(ethylene oxide) (PEO) and poly(propylene oxide) (PPO), known as a Pluronic® surfactants, are used as solubilization agents in pharmaceutical applications (Hurter, P. N. et al., in Solubilization in Surfactant Aggresgates, Christian, S. D., Scamehorn, J. F., Eds., Marcel Dekker, New York, 1995). These macromolecular surfactants have also been extensively studied as a potential drug delivery vehicle due to their excellent biocompatibility (Lee, S. H. et al., *Macromol. Res.*, 10:85-90, 2002). They are among the very few synthetic polymeric materials approved by the U.S. Food and Drug Administration for use as a food additive and pharmaceutical ingredient.

The critical micelle concentration (CMC) of Pluronic® block copolymers is typically very high because of the low hydrophobicity of PPO blocks. This limits the application of Pluronic® micelles because they are not stable and are easily destroyed by dilution when injected into the human body. It is for this reason that chemical modifications of Pluronic® block polymers may be necessary. For example, Pluronic® copolymers have been hydrophobically modified with poly-caprolactone (PCL). The modified block copolymer of PCL-Pluronic®-PCL possess a much lower CMC than the unmodified form due to the hydrophobicity of PCL segments (Ha, J. C. et al., *J. Controlled Release*, 62:381-392, 1999; Kim, S. Y. et al., *J. Controlled Release*, 65:345-358, 2000). Other researchers have grafted Pluronic® block copolymers with poly(acrylic acid) (PAA) and poly(lactic acid)(PLA). The gelation concentration of these modified copolymers is much lower than that of the Pluronic® copolymers (Bromberg, L., *Ind. Eng. Chem. Res.*, 37:4267-4274, 1998; Bromberg, L., *Langmuir*, 14:5806-5812, 1998; Bromberg, L., *Macromolecules*, 31:6148-6156, 1998; Xiong, X. Y. et al., *Macromolecules*, 36:9979-9985, 2003). Such graft copolymer structures combine bioadhesive and hydrophobic properties in a single molecule, retain thermoreversible gelation behavior over a wide pH range, and do not permit physical separation. Therefore, they can be applied in vaginal drug delivery [Chen, G. et al., Proc. Intern. Symp. Control. Rel. Bioact. Mater., 1995, 22, 167; Ron, E. S. et al., Proc. Intern. Symp. Control. Rel. Bioact. Mater., 1996, 23, 128; Ron, E. S. et al., *Pharm. Res.*, 1996 (Suppl.), 13, S299]. A striking feature of Pluronic®-PAA graft-copolymers is the ability to form a thermogel at low polymer concentrations, when neither parent Pluronic® nor 1:1 physical blend of Pluronic® and poly (acrylic acid) shows any signs of gelation (Ron, E. S. et al., Proc. Intern. Symp. Control. Rel. Bioact. Mater., 1996, 23, 128).

Hydrogels as drug carriers are able to provide significant functional advantages due to their physical property resemblance to living tissue. The temperature- or pH sensitive-hydrogels could be used in site-specific delivery of drugs to diseased lesions and have been prepared for low molecular weight and protein drug delivery.

Because of environmental concerns, the commercial utilization of biological polymers has become. an active research area during past decades (Kabanov, A. A. et al., in Amphilic Block Copolymers: Self Assembly and Applications, Alexandrities, P., Lindman, B., Eds., Elsevier, Amsterdam, 1997; Hurter, P. N. et al., in Solubilization in Surfactant Aggregates, Christian, S. D., Scamehorn, J. F., Eds., Marcel Dekker, New York, 1995; Wanka, G. et al., *Macromolecules*, 1994, 27, 4145; Malmsten, M. Lindman, B., *Macromolecules*, 1992, 25, 5440.). Biopolymers have potential advantages compared with synthetic petroleum polymers owing to their biodegradable properties and, in many cases, lower cost.

SUMMARY OF THE INVENTION

We have now successfully prepared hydrogels from biopolymers, and in particular from polymerized vegetable oil starting materials. These hydrogels are similar to Pluronic® type surfactants consisting of block copolymers based on ethylene oxide and propylene oxide in that the molecular structure consists of a combination of hydrophilic and hydrophobic regions. These hydrogels are prepared by means of a ring-opening polymerization of epoxidized vegetable oils, followed by chemical hydrolysis. The recovered hydrogels would have a plurality of end-use applications, including use as food additives and pharmaceutical ingredients.

Accordingly, it is an object of this invention to provide a novel hydrogel made from biopolymers, which are in turn derived from vegetable oils.

It is also an object of the invention to provide an alternative to the existing Pluronic® type surfactants consisting of block copolymers.

It is a further object of the invention to provide a new end-use application and potential market for vegetable oils, and particularly for soybean oil.

Another object of the invention is to provide a facile method for converting epoxidized vegetable oils to hydrogels.

Other objects and advantages of this invention will become readily apparent from the ensuing description.

DETAILED DESCRIPTION

The vegetable starting oil materials for use in the invention include vegetable oils, per se (i.e. triglycerides), as well as diglycerides, unsaturated fatty acids or unsaturated fatty acid monoesters that may be derived from vegetable oils. Vegetable oils and their derivates are non-toxic renewable resources. Vegetable oils of particular interest are those conventionally referred to as "drying oils".

The drying oils contemplated herein include plant, animal, synthetic and semi-synthetic glycerides, particularly triglycerides, that can be transformed into hard, resinous materials (see Encyclopedia of Polymer Science and Technology, ed. H. F. Monk et al., John Wiley & Sons, 1966, pp. 216-234). The expression "drying oils" is generic to both drying oils, which dry (harden) at normal atmospheric conditions, and semidrying oils, which must be baked at elevated temperatures in order to harden. Unless otherwise indicated, "drying oil" will be used herein in its broadest sense to refer to both types of drying oil. The unsaturated fatty acids of a drying or semidrying oil comprise double bonds that are readily available for entering into oxidative or other reactions involved in the drying process. Common sources of drying oils include castor oil, fish oil, linseed oil, oiticica oil, safflower oil, soybean oil, sunflower oil, and tung oil. Of course the oils that contain the higher levels of polyunsaturated fatty acid (e.g. linoleic acid and linolenic acid) moieties, such as soybean oil, linseed oil and safflower oil are the most reactive in terms of having available functional sites for cross-linking.

For purposes of the invention, it is desirable that the number of functional groups (sites of unsaturation or oxirane rings) be at least two for at least about 33% of the fatty acid moieties (or residues) represented in the starting mixture. Soybean oil, for example, typically comprises about 63% (by weight) polyunsaturated fatty acid moieties (55% linoleic acid and 8% linolenic acid). The aforementioned desired starting material constitution would not preclude the presence of monounsaturated fatty acid moieties (which enter into the polymerization reaction but tend to limit the degree of polymerization) or of saturated fatty acid moieties (which would not directly enter into the polymerization at all) in the starting material. Clearly, the cross-linking reaction is enhanced by virtue of moieties having of two or more available functional groups (i.e. oxirane rings).

The drying oils may be polymerized (i.e. cross-linked) through a variety of mechanisms, linkages, and cross-linkers. For instance, the cross-linking may be "intra", that is, between fatty acid ester chains on the same triglyceride; or it may be "inter", that is, between a fatty acid ester chain of one triglyceride and a fatty acid ester chain on another triglyceride. The cross-linking, whether intra or inter, may be directly from one fatty acid moiety to another, or may involve a linker, such as that resulting from reaction of an epoxidized oil with a curing agent, such as a polyol, a polybasic acid, an amine, a polyamine, a polythiol, or a polyphenol. Specific exemplary reagents for this purpose include:

| | |
|---|---|
| polyols: | ethylene glycol, glycerol, sorbitol, propylene glycol, and oligomers thereof; as well as hydroxylated oils such as castor oil |
| polybasic acids: | succinic acid, adipic acid, butane tetracarboxylic acid, citric acid, succinic anhydride, octenylsuccinic anhydride, and phthalic anhydride; |
| amines: | octylamine, and ethylamine; |
| polyamines: | ethylene diamine and triethylene tetramine; |
| polyphenols: | phenol-formaldehyde resin |

A preferred curing agent is citric acid, because of its rapid rate of reaction with epoxidized oil at relatively low temperatures. Another approach to cross-linking is to react the drying oil with maleic anhydride and then react the maleated oil with a polyol. Also contemplated herein are cross-linked alkyds produced by reacting a polyol with a polybasic acid and free fatty acids.

In the preferred embodiment of the invention, the drying oil is first either partially or completely epoxidized. The double bonds in unsaturated fatty acids moieties may be converted into the more reactive oxirane functionality by reaction with peracids or peroxides as known in the art. In fact, commercially-available epoxidized oils, fatty acids, or fatty acid esters may be used as the starting material in the preparation of the subject hydrogels. The oxirane rings of the epoxidized oil are the functional groups available for cross-linking in the presence of a suitable initiator. In the case of direct cross-linking from one functional group to another, a chemical initiator, such as a Lewis acid or strong protonic acid may be used. Exemplary Lewis acids include $BF_3$ and $SbCl_5$; exemplary strong protonic acids include sulfuric, trifluoroacetic, flurosulfonic, and trifluoromethanesulfonic acids. Alternatively, the epoxidized oil may be reacted with a curing agent to modify the drying oil by addition of a linker as described above. When acidic catalysts such as quaternary ammonium halides are used to promote the latter reaction, the primary reaction product is a polyester containing a secondary hydroxyl group beta to the carboxyl carbon. Other catalysts for effecting polymerization across the oxirane ring are well established in the art.

Partial polymerization is easily controlled by regulating the temperature of reaction. For example, the reaction can be stopped by rapidly lowering the temperature of the mixture, as in ice water, so as to control the molecular weight of the polymer. Partially reacted epoxidized oils are available for photoinitiated cross-linking through the remaining oxirane rings. For the partially epoxidized oils, oxidative cross-linking can be promoted between remaining sites of unsaturation and reactive functional groups introduced by the curing agent.

The catalytic ring-opening polymerization of the epoxidized vegetable oil generally is carried out at low temperature (0-50° C.), resulting in the formation of high-molecular-weight polymers in high yield. Alternatively, polymerization can be carried out in an organic medium or in an environmentally-friendly liquid or supercritical-$CO_2$ medium. The reaction using epoxidized soybean oil (ESO) is illustrated in Reaction Scheme 1, below.

Reaction Scheme 1

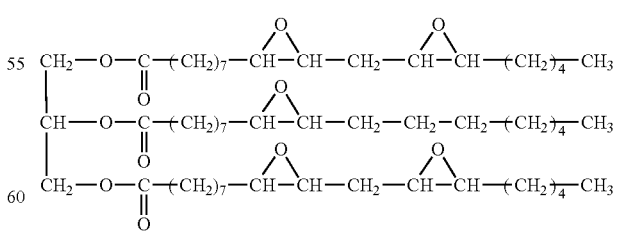

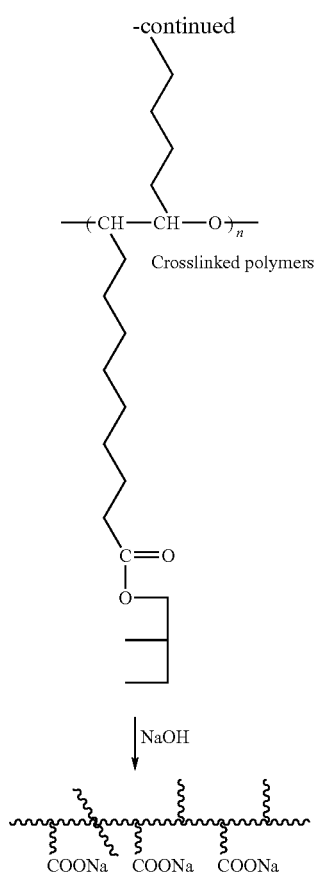

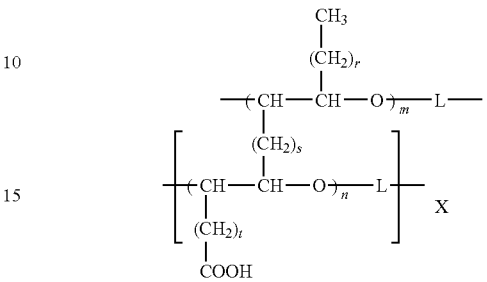

When the starting material is either a monoester or a glyceride, then the cross-linked product is subsequently subjected to chemical hydrolysis in order to yield carboxylic functional groups. The hydrolysis cleaves the ester group from the fatty acid moiety. In the case of di- and tri-glycerides, the hydrolysis simultaneously removes the glyceride backbone and any non-cross-linked fatty acid moieties from the polyether chain.

Chemical hydrolysis can be carried out, for example, by reflux of the cross-linked product in alkali, such as sodium hydroxide solution. This, of course, yields the alkali metal salt hydrogel precursor as illustrated in Reaction Scheme I, supra. The actual hydrogel is recovered by precipitating the salt form of the polymer with a mineral acid or organic acid, particularly with a strong acid such as HCl. After washing the precipitate with water, it may be desirable to treat it further with a weak acid, such as acetic, citric or the like.

For end-use applications involving mammalian systems, it is usually desirable for the hydrogel to be as pH-neutral as possible. The preferred pH is in the range of pH 5.5-8.5, more preferably pH 6-8, and even more preferably pH 7-8. It is generally accepted that an optimum pH for most orally-administered delivery systems intended for humans is pH 7.4. After acid precipitation as described above, the pH can be corrected, such as by controlled addition of alkali. A protocol for predetermining an appropriate amount of alkali is described in Example 5, below. In the process of final recovery, the hydrogel may be washed and dried by methods as known in the art.

The product recovered after hydrolysis is substantially free of glycerol and any unreacted fatty acids, particularly saturated fatty acids. The structure of the polymeric compositions of the invention comprises cross-linked vegetable oil fatty acid monomeric units. The polymer is characterized by a structure comprising at least one polyether backbone, a plurality of hydrophobic alkyl groups and a plurality of hydrophilic carboxyl groups as illustrated below by Structure 1:

or an alkali metal salt thereof

STRUCTURE 1 wherein:

L represents an optional linker as described above;

$x=0-2$;

r, s and t are independently selected from values within the range of 1-11, and preferably, $r=1-7$, $s=1$ and $t=7$; and m and n independently vary as a function of the degree of polymerization.

The value of x in Structure 1 is a function of the number of functional groups (i.e. oxirane rings) in a given reactant fatty acid moiety. The person in the art will appreciate that the second or third polyether backbone illustrated within brackets is likely to be discontinuous as a result of cross-linking among fatty acid moieties. Typically, each of the monomeric units of the polymer will comprise one hydrophobic alkyl group and one hydrophilic carboxyl group.

The resulting hydrogels are characterized by physical and functional properties very similar to the Pluronic® block copolymers described, for example, in U.S. Pat. No. 6,639,014, herein incorporated by reference (see-particularly columns 5-9). The molecular weight of the hydrogels of the invention will typically be in the range of about 2000-4000 g/mole by the Mn method and about 2400-5000 g/mole by the Mw method.

The hydrogels of the present invention will also have end-use applications similar to those of the Pluronic® block copolymers of U.S. Pat. No. 6,639,014 (see cols. 9-12). They are envisioned for use as in controlled delivery of bioactive agents, especially pharmaceutical and therapeutic agents for both human and veterinary applications. The hydrogels may also be used for delivery of adjuvants, vehicles and carriers that may be used in conjunction with bioactive agents. In addition, these hydrogels also find application as a topical treatment or wound dressing for various skin conditions including for example inflammations, burns, dermatitis, abrasions, etc.

The following examples are intended to further illustrate the invention, without any intent for the invention to be limited to the specific embodiments described therein.

All references disclosed herein or relied upon in whole or in part in the description of the invention are incorporated by reference.

EXAMPLES 1-4

Preparation of Hydrogel from Epoxidized Soybean Oil Materials

ESO was obtained from Alf Atochem Inc. (Philadelphia, Pa.) and used as received. Scheme 1, supra, shows the chemical structure of ESO. Boron trifluoride diethyl etherate, $(C_2H_5)_2 O BF_3$, purified and redistilled, was provided by Aldrich Chemical, Inc. (Milwaukee, Wis.). Methylene chloride was purchased from Fisher Scientific (Fair Lawn, N.J.).

EXAMPLE 1

ESO Ring-opening Polymerization in Methylene Chloride

Thirty g ESO and 300 ml methylene chloride were added to a 500 ml flask fitted with a mechanical stirrer, condenser, thermometer, nitrogen line and dropping funnel. Temperature was cooled to 0° C. by an ice bath and 0.396 g $BF_3$ (diethyl etherate) was added drop wise in 2 minutes. The system was maintained for 3 hrs. The methylene chloride was removed using a rotary evaporator. The remaining product was dried under vacuum at 70° C. to a constant weight, yielding 29.8 g of polymer ("PESO").

EXAMPLE 2

ESO Ring-opening Polymerization in Liquid $CO_2$

Polymerization reaction was carried out in a 600 cc Parr reactor equipped with high temperature fabric heating mantles housed in a sturdy aluminum shell. The reactor was attached to an ISCO Model 260D high pressure syringe pump used to charge the reactor with $CO_2$ and catalyst $BF_3$ (diethyl etherate). Thirty g ESO was added to the reactor, which was then sealed. $CO_2$ was pumped in until the desired pressure (liquid $CO_2$, 1000 psi, at 25° C.) was reached. After 3 hrs, 5 ml ethanol and water solution was injected into the reactor to kill the catalyst. By washing several times with water, polymer was dried under vacuum at 70° C. to a constant weight yielding 29.8 g of polymer ("PESO").

EXAMPLE 3

ESO Ring-opening Polymerization in Supercritical $CO_2$

The procedure of Example 2 was repeated except supercritical conditions (1200 psi and 60° C.) were employed. After 3 hrs, 5 ml ethanol and water solution was injected into the reactor to kill the catalyst. By washing several times with water, polymer was dried under vacuum at 70° C. to a constant weight yielding 29.8 g of polymer ("PESO").

EXAMPLE 4

Hydrolysis of PESO Using NaOH

PESO (2.5 g) in 50 ml 0.4N NaOH was refluxed for 24 hr. Then the solution was filtered through filter paper and cooled to room temperature. The resulting gel was precipitated with 80 ml 1.0 N HCl, followed by washing with water several times, and then with 10% (v/v) acetic acid twice. The resulting polymer was dried in the oven at 80° C. overnight, and then further dried under vacuum at 70° C. to a constant weight (2.1 g). The product was referred to as "HPESO".

EXAMPLE 5

Ion-exchange Value Determination for Purposes of Neutralization

The proton equivalent in the carboxylic groups in HPESO samples were determined as cation exchange capacity by the Kunin method (Kunin, R., "Ion Exchange Resins", Robert E. Krieger Publishing Co., Huntington, N.Y., 1972). In accordance with this protocol, 5.0 grams of HPESO were placed in a funnel. This sample was converted to the hydrogen form with 1 liter of 1 M $HNO_3$. The sample was then rinsed free of excess acid and drained. A sample of the rinsed material (approximately 6.0 gram) was placed into a dry ml Erlenmeyer flask, and the remaining sample was used to determine the solid content, drying at 110° C. overnight. To the sample in the Erlenmeyer flask, exactly 200 ml of standardized 0.1 N NaOH solution that had been prepared in 5 per cent sodium chloride was added and the mixture was allowed to stand overnight. Aliquots of the supernatant liquid were then back-titrated to the phenolphthalein end point with standard 0.1 N acid. The cation exchange capacity (CEC) was calculated as follows:

(200×N NaOH)-4(Milliters Acid×N Acid/Sample weight×per cent solids/100=Meq/g dry soy polymer The cation exchange capacities (CEC) of 3 soy-based polymers are shown as Table 1, below. Based on the CEC, the amount of sodium hydroxide to neutralize the carboxylic group was calculated. For example, 5.5 g of HPESO-13 in proton form required 0.6578 g NaOH to neutralize. The neutralized HPESO sample can form hydrogel in 100 ml pH 8 buffer solution.

EXAMPLE 6

FT-IR Analysis

FTIR spectra were recorded on a Therma Nicolet 470 FT-IR system (Madison, Wis.) in a scanning range of 650-4000 $cm^{-1}$ for 32 scans at a spectra resolution of 4 $cm^{-1}$. Spectra of PESO and HPESO (not shown) were run as KBr pellets and the spectrum of ESO (not shown) was run as neat liquid. The characteristic oxirane absorption at 823.3 $cm^{-1}$ in ESO is not present in PESO due to the ring-opening polymerization. The IR spectrum obtained after hydrolysis of PESO by NaOH showed a shift in the ester carbonyl band to 1718.9 $cm^{-1}$ from 1734.5 $cm^{-1}$ when compared to PESO, due to strong H-bonding of the carboxylic acids as dimers. Hydrogen bonding and resonance weaken the C=O bond, resulting in absorption at a lower frequency.

EXAMPLE 7

NMR Analysis

Solid $^{13}C$ NMR spectra were recorded using a Bruker ARX-300 for PESO samples because they did not dissolve in solvents. $^1H$ and $^{13}C$ NMR spectra for HPESO samples were recorded quantitatively using a Bruker ARX-400 spectrometer (Bruker, Rheinstetten, Germany) at an observing frequency of 400 and 100 MHz respectively on a 5 mm dual probe. For $^1H$ and $^{13}C$, sample solutions were prepared in deuterated chloroform ($CDCl_3$, 99.8% D, Aldrich, Milwaukee, Wis.) in 15% and 30% v/v concentrations respectively.

Proton NMR spectra were obtained on 16 scans at a delay time of 1 s. For Distorsionless Enhancement by Polarization Transfer (DEPT 135) measurements, similar sample concentration as the $^{13}$C NMR experiment was maintained. This technique was used to identify and compute the relative distribution of —$CH_n$— (n=0-3) carbons in the product.

The peak assignments for $^1$H NMR spectrum of ESO (not shown) were conducted using DEPT 135 and COSY 45 NMR experiments. The epoxy protons are observed in the δ 3.0-3.2 ppm region. Methine protons of —$CH_2$—CH—$CH_2$— backbone are observed at δ 5.1-5.3 ppm, methylene proton of —$CH_2$—CH—$CH_2$— backbone at δ 4.0-4.4 ppm, $CH_2$ proton adjacent to two epoxy group at δ 2.8-3.0 ppm —CH— protons of epoxy ring at δ 3.0-3.2 ppm, α-$CH_2$ to >C=O at δ 2.2-2.4 ppm, α-$CH_2$ to epoxy group at δ 1.7-1.9 ppm, β-$CH_2$ to >C=O at δ 1.55-1.7 ppm, β-$CH_2$ to epoxy group at δ 1.4-1.55 ppm, saturated methylene groups at δ 1.1-1.4 ppm and terminal —$CH_3$ groups at δ 0.8-1.0 ppm region.

In $^{13}$C NMR spectrum of ESO (not shown), it can be seen that peaks at 54-57 ppm are due to epoxy carbons. The presence of $^{13}$C NMR peak at 173.1 ppm is due to carbonyl carbon of triacylglycerol. Peaks at 68.9 ppm and 62 ppm, respectively, assign for CH and $CH_2$ carbons of the —$CH_2$—CH—$CH_2$— glycerol backbone.

In solid $^{13}$C NMR spectrum of PESO (not shown), it can be seen that a peak at 75 ppm is due to carbons of the —$CH_2$—CH—$CH_2$— glycerol backbone. Presence of $^{13}$C NMR peak at 175 ppm is due to carbonyl carbon of triacylglycerol. Peaks are assigned at 35 ppm due to $CH_2$ carbons a to the carbonyl in PESO and at 25 ppm due to methyl carbons of $CH_3$ group located at end of the fatty acid chain. In addition, the disappearance of epoxy carbon peaks in the range of 54-57 ppm is observed.

$^1$H NMR and $^{13}$C NMR spectra of HPESO (not shown) indicate disappearance of epoxy carbon peaks in the range of 54-57 ppm. Epoxy protons are observed in the range of 3.0-3.2 ppm region. Peaks at 68.9 ppm and 62 ppm assigned for CH and $CH_2$ carbons of —$CH_2$—CH—$CH_2$— glycerol backbone also disappeared due to hydrolysis of glycerol.

EXAMPLE 8

GPC Analysis

GPC profiles were obtained on a PL-GPC 120 high temperature chromatography (Polymer Laboratories, Ltd., Amherst, Mass.) equipped with in-built of differential refractometer detector and an autosampler using polymer styrene standard with molecular weights of 1700, 2450, 5050, 7000, 9200 and 10665 g/mole (Polymer Laboratories, Ltd., Amherst, Mass.) for calibration. HPESO samples for GPC analysis were prepared as described in Example 4. The effects of polymerization temperature and catalyst amount on molecular weight are shown in Table 2 and Table 3, below.

TABLE 1

Cation Exchange Capacities of Soy-Based Polymers

| Sample | ESO (g) | Catalyst (g) | T ° C. | CEC (meq/g) |
|---|---|---|---|---|
| HPESO-1 | 10 | 0.293 | 0 | 1.65 |
| HPESO-8 | 30 | 0.190 | 50 | 1.86 |
| HPESO-13 | 30 | 1.090 | 0 | 2.99 |

TABLE 2

Effect of Polymerization Temperature on Molecular Weight

| Sample | ESO (g) | Catalyst (g) | T ° C. | Mn | Mw |
|---|---|---|---|---|---|
| HPESO-8 | 30 | 0.19 | 50 | 2131 | 2439 |
| HPESO-9 | 30 | 0.19 | 40 | 2125 | 3245 |
| HPESO-10 | 30 | 0.19 | 30 | 2184 | 2872 |
| HPESO-11 | 30 | 0.19 | 20 | 2142 | 2461 |
| HPESO-12 | 30 | 0.19 | 0 | 2371 | 2972 |

TABLE 3

Effect of Catalyst Amount on Molecular Weight

| Sample | ESO (g) | Catalyst (g) | T ° C. | Mn | Mw |
|---|---|---|---|---|---|
| HPESO-1 | 10 | 0.293 | 0 | 3160 | 4866 |
| HPESO-2 | 10 | 0.220 | 0 | 3808 | 4139 |
| HPESO-3 | 10 | 0.132 | 0 | 2606 | 3219 |
| HPESO-4 | 10 | 0.089 | 0 | 2155 | 2615 |

We claim:

1. A polymeric composition comprising cross-linked vegetable oil fatty acid monomeric units with at least one polyether backbone, a plurality of hydrophobic alkyl groups and a plurality of hydrophilic carboxylate groups and having the chemical structure:

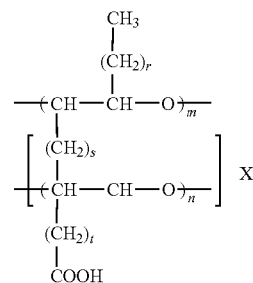

or an alkali metal salt thereof;
wherein:
x=0-2;
r, s and t are independently selected from values within the range of 1-11; and
m and n independently vary as a function of the degree of polymerization.

2. The polymeric composition of claim 1, wherein each one of said monomeric units comprises one hydrophobic alkyl group and one hydrophilic carboxylate group.

3. The polymeric composition of claim 1, wherein said carboxylate groups are sodium carboxylic acid salts.

4. The polymeric composition of claim 1, wherein said carboxylate groups are substantially all in the acid form.

5. The polymeric composition of claim 1, wherein said vegetable oil is selected from the group consisting of soybean oil, linseed oil and safflower oil.

6. The polymeric composition of claim 1, wherein said fatty acid monomeric units comprise a mixture of oleic, linoleic and linolenic acids.

7. The polymeric composition of claim 1, wherein said fatty acid monomeric units comprise at least about 60% by weight linoleic and linolenic acids.

8. The polymeric composition of claim 1, wherein the average molecular weight, Mw, is in the range of 2400-5000 g/mole.

9. The polymeric composition of claim 1, wherein r=1-7, s=1, and t=7.

10. A method for producing a polymeric composition comprising cross-linked vegetable oil fatty acid monomeric units, said composition characterized by a structure comprising at least one polyether backbone, a plurality of hydrophobic alkyl groups and a plurality of hydrophilic carboxylate groups, said method comprising:
   a. cross-linking an epoxidized vegetable starting oil material selected from the group consisting of triglyceride, diglyceride, unsaturated fatty acid and unsaturated fatty acid monoester, and mixtures thereof thereby yielding cross-linked vegetable oil fatty acid monomeric units;
   b. recovering said cross-linked vegetable oil fatty acid monomeric units substantially free of non-cross-linked fatty acids, glycerides thereof, and glycerol, thereby yielding said polymeric composition.

11. The method of claim 10, wherein said cross-linking is conducted in the presence of a catalyst and in a solvent selected from the group consisting of organic solvent, liquid carbon dioxide, and supercritical carbon dioxide.

12. The method of claim 10, wherein said vegetable oil starting material comprises a triglyceride, diglyceride, or unsaturated fatty acid monoester and said method further comprises hydrolyzing said cross-linked vegetable oil fatty acid monomeric units in order to cleave said units from glycerides of said non-cross-linked fatty acids.

13. The method of claim 12, wherein said hydrolyzing is conducted with an alkali.

14. The method of claim 13, wherein said alkali is sodium hydroxide.

15. The method of claim 13, wherein said recovering in step (b) comprises treating said cross-linked vegetable oil fatty acid monomeric units with acid in order to precipitate said polymeric composition as a hydrogel.

16. The method of claim 15, wherein said recovering further comprises adjusting the pH of said hydrogel to a pH in the range of pH 5.5-8.5.

17. The method of claim 16, wherein said pH is in the range of pH 7-8.

18. The method of claim 10, wherein said vegetable oil starting material is a triglyceride vegetable oil selected from the group consisting of soybean oil, linseed oil and safflower oil.

\* \* \* \* \*